US010263898B2

(12) United States Patent
Jeuk et al.

(10) Patent No.: US 10,263,898 B2
(45) Date of Patent: Apr. 16, 2019

(54) SYSTEM AND METHOD FOR IMPLEMENTING UNIVERSAL CLOUD CLASSIFICATION (UCC) AS A SERVICE (UCCAAS)

(71) Applicant: Cisco Technology, Inc., San Jose, CA (US)

(72) Inventors: Sebastian Jeuk, San Jose, CA (US); Gonzalo Salgueiro, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 168 days.

(21) Appl. No.: 15/215,499

(22) Filed: Jul. 20, 2016

(65) Prior Publication Data

US 2018/0026893 A1 Jan. 25, 2018

(51) Int. Cl.
| | | |
|---|---|---|
| H04L 12/26 | (2006.01) | |
| H04L 12/813 | (2013.01) | |
| H04L 12/851 | (2013.01) | |
| H04L 12/859 | (2013.01) | |
| H04L 12/24 | (2006.01) | |

(52) U.S. Cl.
CPC .......... *H04L 47/20* (2013.01); *H04L 41/5051* (2013.01); *H04L 47/2441* (2013.01); *H04L 47/2475* (2013.01)

(58) Field of Classification Search
None
See application file for complete search history.

(56) References Cited

U.S. PATENT DOCUMENTS

| | | |
|---|---|---|
| 5,812,773 A | 9/1998 | Norin |
| 5,889,896 A | 3/1999 | Meshinsky et al. |
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

(Continued)

*Primary Examiner* — Chi H Pham
*Assistant Examiner* — Fahmida S Chowdhury
(74) *Attorney, Agent, or Firm* — Polsinelli PC

(57) ABSTRACT

Disclosed is a system and method of providing transport-level identification and isolation of container traffic. The method includes assigning, by a software-defined-network (SDN) controller in an SDN-enable cloud environment, a service-ID to a service, a tenant-ID to a tenant and/or workload-ID to yield universal cloud classification details, and extracting, from a data flow, the universal cloud classification details. The method includes receiving a policy, generating flow rules based on the policy and universal cloud classification details, and transmitting the flow rules to an openflow application to confine packet forwarding decisions for the data flow.

20 Claims, 3 Drawing Sheets

(56) References Cited

U.S. PATENT DOCUMENTS

| | | |
|---|---|---|
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,885,670 B1 | 4/2005 | Regula |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,076,397 B2 | 7/2006 | Ding et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B2 | 1/2010 | Togawa |
| 7,684,322 B2 | 3/2010 | Sand et al. |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B2 | 10/2012 | Aymeloglu et al. |
| 8,284,664 B1 | 10/2012 | Aybay et al. |
| 8,284,776 B2 | 10/2012 | Petersen |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,252 B2 | 7/2013 | Lais et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,182 B1 | 9/2014 | Fritz et al. |
| 8,856,339 B2 | 10/2014 | Mestery et al. |
| 8,880,678 B1* | 11/2014 | Colton .............. G06F 9/5072 709/203 |
| 8,909,780 B1 | 12/2014 | Dickinson et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,104,334 B2 | 8/2015 | Madhusudana et al. |
| 9,143,612 B2* | 9/2015 | Roncoroni ........ H04M 3/42059 |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,313,048 B2 | 4/2016 | Chang et al. |
| 9,361,192 B2 | 6/2016 | Smith et al. |
| 9,380,075 B2 | 6/2016 | He et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,613,078 B2 | 4/2017 | Vermeulen et al. |
| 9,628,471 B1 | 4/2017 | Sundaram et al. |
| 9,632,858 B2 | 4/2017 | Sasturkar et al. |
| 9,658,876 B2 | 5/2017 | Chang et al. |
| 9,692,802 B2 | 6/2017 | Bicket et al. |
| 9,727,359 B2 | 8/2017 | Tsirkin |
| 9,736,063 B2 | 8/2017 | Wan et al. |
| 9,755,858 B2 | 9/2017 | Bagepalli et al. |
| 9,792,245 B2 | 10/2017 | Raghavan et al. |
| 9,804,988 B1 | 10/2017 | Ayoub et al. |
| 9,954,783 B1 | 4/2018 | Thirumurthi et al. |
| 2002/0004900 A1 | 1/2002 | Patel |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0059558 A1 | 3/2006 | Selep et al. |
| 2006/0104286 A1 | 5/2006 | Cheriton |
| 2006/0120575 A1 | 6/2006 | Ahn et al. |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0294207 A1 | 12/2006 | Barsness et al. |
| 2007/0011330 A1 | 1/2007 | Dinker et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0010277 A1 | 1/2009 | Halbraich et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |

(56) References Cited

U.S. PATENT DOCUMENTS

| | | |
|---|---|---|
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0217886 A1 | 8/2010 | Seren et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325257 A1 | 12/2010 | Goel et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0199902 A1 | 8/2011 | Leavy et al. |
| 2011/0213687 A1 | 9/2011 | Ferris et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0023418 A1 | 1/2012 | Frields et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0166649 A1 | 6/2012 | Watanabe et al. |
| 2012/0167094 A1 | 6/2012 | Suit |
| 2012/0173541 A1 | 7/2012 | Venkataramani |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185632 A1 | 7/2012 | Lais et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0203908 A1 | 8/2012 | Beaty et al. |
| 2012/0204169 A1 | 8/2012 | Breiter et al. |
| 2012/0204187 A1 | 8/2012 | Breiter et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0069950 A1 | 3/2013 | Adam et al. |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1* | 5/2013 | Kempf ............... G06F 9/45533 718/1 |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185413 A1 | 7/2013 | Beaty et al. |
| 2013/0185433 A1 | 7/2013 | Zhu et al. |
| 2013/0191106 A1 | 7/2013 | Kephart et al. |
| 2013/0198050 A1 | 8/2013 | Shroff et al. |
| 2013/0198374 A1 | 8/2013 | Zalmanovitch et al. |
| 2013/0204849 A1 | 8/2013 | Chacko |
| 2013/0232491 A1 | 9/2013 | Radhakrishnan et al. |
| 2013/0232492 A1 | 9/2013 | Wang |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0019639 A1 | 1/2014 | Ueno |
| 2014/0040473 A1 | 2/2014 | Ho et al. |
| 2014/0040883 A1 | 2/2014 | Tompkins |
| 2014/0052877 A1 | 2/2014 | Mao |
| 2014/0059310 A1 | 2/2014 | Du et al. |
| 2014/0074850 A1 | 3/2014 | Noel et al. |
| 2014/0075048 A1 | 3/2014 | Yuksel et al. |

(56) References Cited

U.S. PATENT DOCUMENTS

| | | |
|---|---|---|
| 2014/0075108 A1 | 3/2014 | Dong et al. |
| 2014/0075357 A1 | 3/2014 | Flores et al. |
| 2014/0075501 A1* | 3/2014 | Srinivasan .............. G06F 21/62 726/1 |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0160924 A1 | 6/2014 | Pfautz et al. |
| 2014/0164486 A1 | 6/2014 | Ravichandran et al. |
| 2014/0169215 A1* | 6/2014 | Rajendran ............ H04L 41/0806 370/254 |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0269266 A1 | 9/2014 | Filsfils et al. |
| 2014/0280805 A1 | 9/2014 | Sawalha |
| 2014/0282536 A1 | 9/2014 | Dave et al. |
| 2014/0282611 A1 | 9/2014 | Campbell et al. |
| 2014/0282669 A1 | 9/2014 | McMillan |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0314078 A1 | 10/2014 | Jilani |
| 2014/0317261 A1 | 10/2014 | Shatzkamer et al. |
| 2014/0366155 A1 | 12/2014 | Chang et al. |
| 2014/0372567 A1 | 12/2014 | Ganesh et al. |
| 2015/0006470 A1 | 1/2015 | Mohan |
| 2015/0033086 A1 | 1/2015 | Sasturkar et al. |
| 2015/0043335 A1 | 2/2015 | Testicioglu et al. |
| 2015/0043576 A1 | 2/2015 | Dixon et al. |
| 2015/0052247 A1* | 2/2015 | Threefoot .............. H04L 67/10 709/225 |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0058557 A1 | 2/2015 | Madhusudana et al. |
| 2015/0070516 A1 | 3/2015 | Shoemake et al. |
| 2015/0071285 A1 | 3/2015 | Kumar et al. |
| 2015/0089478 A1 | 3/2015 | Cheluvaraju et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0109923 A1 | 4/2015 | Hwang |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0149828 A1 | 5/2015 | Mukerji et al. |
| 2015/0178133 A1 | 6/2015 | Phelan et al. |
| 2015/0215819 A1 | 7/2015 | Bosch et al. |
| 2015/0227405 A1* | 8/2015 | Jan ..................... G06F 11/079 714/37 |
| 2015/0227406 A1* | 8/2015 | Jan ..................... G06F 11/079 714/37 |
| 2015/0242204 A1 | 8/2015 | Hassine et al. |
| 2015/0249709 A1 | 9/2015 | Teng et al. |
| 2015/0271199 A1 | 9/2015 | Bradley et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2015/0379062 A1 | 12/2015 | Vermeulen et al. |
| 2016/0011925 A1 | 1/2016 | Kulkarni et al. |
| 2016/0013990 A1 | 1/2016 | Kulkarni et al. |
| 2016/0062786 A1 | 3/2016 | Meng et al. |
| 2016/0065417 A1 | 3/2016 | Sapuram et al. |
| 2016/0094398 A1 | 3/2016 | Choudhury et al. |
| 2016/0094480 A1 | 3/2016 | Kulkarni et al. |
| 2016/0094643 A1 | 3/2016 | Jain et al. |
| 2016/0094894 A1 | 3/2016 | Inayatullah et al. |
| 2016/0099847 A1 | 4/2016 | Melander et al. |
| 2016/0099873 A1 | 4/2016 | Geröet al. |
| 2016/0103838 A1 | 4/2016 | Sainani et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0147676 A1 | 5/2016 | Cha et al. |
| 2016/0162436 A1 | 6/2016 | Raghavan et al. |
| 2016/0164914 A1 | 6/2016 | Madhav et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1* | 9/2016 | Narayanaswamy ........................ G06F 21/6218 |
| 2016/0292611 A1 | 10/2016 | Boe et al. |
| 2016/0352682 A1 | 12/2016 | Chang |
| 2016/0378389 A1 | 12/2016 | Hrischuk et al. |
| 2017/0005948 A1 | 1/2017 | Melander et al. |
| 2017/0024260 A1 | 1/2017 | Chandrasekaran et al. |
| 2017/0026470 A1 | 1/2017 | Bhargava et al. |
| 2017/0034199 A1 | 2/2017 | Zaw |
| 2017/0041342 A1 | 2/2017 | Efremov et al. |
| 2017/0054659 A1 | 2/2017 | Ergin et al. |
| 2017/0063674 A1 | 3/2017 | Maskalik et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0126583 A1 | 5/2017 | Xia |
| 2017/0147297 A1 | 5/2017 | Krishnamurthy et al. |
| 2017/0163569 A1 | 6/2017 | Koganti |
| 2017/0171158 A1 | 6/2017 | Hoy et al. |
| 2017/0192823 A1 | 7/2017 | Karaje et al. |
| 2017/0264663 A1 | 9/2017 | Bicket et al. |
| 2017/0300359 A1* | 10/2017 | Kollur .................. G06F 9/5022 |
| 2017/0302521 A1 | 10/2017 | Lui et al. |
| 2017/0310556 A1 | 10/2017 | Knowles et al. |
| 2017/0317932 A1 | 11/2017 | Paramasivam |
| 2017/0339070 A1 | 11/2017 | Chang et al. |
| 2018/0069885 A1 | 3/2018 | Patterson et al. |
| 2018/0173372 A1 | 6/2018 | Greenspan et al. |
| 2018/0174060 A1 | 6/2018 | Velez-Rojas et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "Open Data Center Alliance Usage: Virtual Machine (VM) Interoperability in a Hybrid Cloud Environment Rev. 1.2," Open Data Center Alliance, Inc., 2013, 18 pages.

(56) References Cited

OTHER PUBLICATIONS

Author Unknown, "Real-Time Performance Monitoring on Juniper Networks Devices, Tips and Tools for Assessing and Analyzing Network Efficiency," Juniper Networks, Inc., May 2010, 35 pages.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.
Amedro, Brian, et al., "An Efficient Framework for Running Applications on Clusters, Grids and Cloud," 2010, 17 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Kunz, Thomas, et al., "OmniCloud—The Secure and Flexible Use of Cloud Storage Services," 2014, 30 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.

(56) References Cited

OTHER PUBLICATIONS

Ye, Xianglong, et al., "A Novel Blocks Placement Strategy for Hadoop," 2012 IEEE/ACTS 11$^{th}$ International Conference on Computer and Information Science, 2012 IEEE, 5 pages.

Al-Harbi, S.H., et al., "Adapting κ-means for supervised clustering," Jun. 2006, Applied Intelligence, vol. 24, Issue 3, pp. 219-226.

Bohner, Shawn A., "Extending Software Change Impact Analysis into COTS Components," 2003, IEEE, 8 pages.

Hood, C. S., et al., "Automated Proactive Anomaly Detection," 1997, Springer Science and Business Media Dordrecht, pp. 688-699.

Vilalta R., et al., "An efficient approach to external cluster assessment with an application to martian topography," Feb. 2007, 23 pages, Data Mining and Knowledge Discovery 14.1: 1-23. New York: Springer Science & Business Media.

\* cited by examiner

US 10,263,898 B2

SYSTEM AND METHOD FOR IMPLEMENTING UNIVERSAL CLOUD CLASSIFICATION (UCC) AS A SERVICE (UCCAAS)

TECHNICAL FIELD

The present disclosure provide for universal cloud classification (UCC) "as a Service" as a way to make the cloud-ID available to the provider, tenants and applications in a cloud environment. While being transmitted on the network layer, the IDs are accessible by application programming interfaces (APIs) through the UCCaaS application. Direct access to these IDs providers, tenants and applications enables policy enforcement.

BACKGROUND

Universal Cloud Classification (UCC) is a tiered/hierarchical model used to incorporate Cloud-ID natively in the transport layer. It enables segmentation and classification of traffic based on cloud entities such as Cloud providers, services and tenants. The implementation approach of UCC thus far has been 'default on', meaning that UCC is either enabled or disabled for the entire environment. There is currently no way to enable and disable UCC on-demand as well as dynamically enable it on a per-tenant basis.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Figure 1:
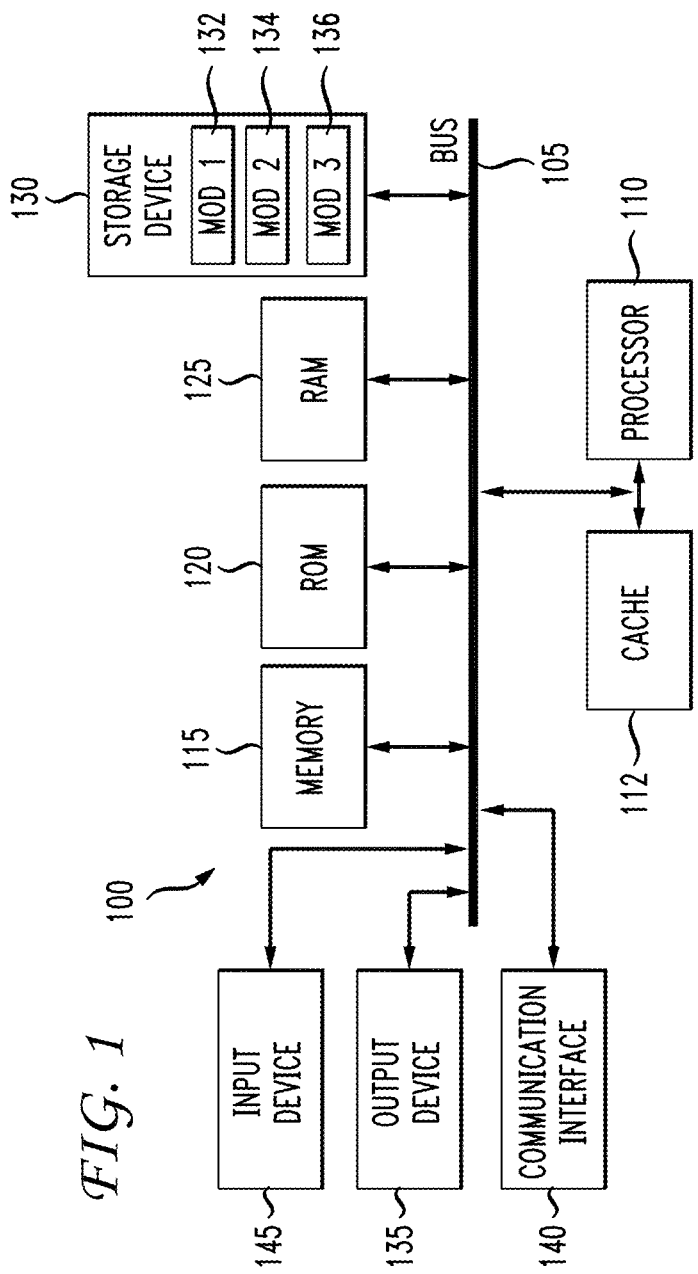
FIG. 1 illustrates the basic computing components of a computing device according to an aspect of this disclosure.

The present disclosure addresses the above-identified issues. The UCC introduced above incorporates a cloud-ID, tenant-ID, and service-ID into the layer 3 of the network so that network entities in an environment or across different environments can use these IDs to perform policy enforcement. It is difficult to manage policies at scale. With the UCC visibility into the network layer, one can apply policies with less overhead processes. The UCC information provides visibility into the network, the services and tenants. The IDs can be used to apply policies against tenants, services, and cloud providers. The present disclosure extends and applies the use of these various IDs, and introduces a new workload-ID, through a UCC as a Service (USSaaS) component.

The present disclosure provides a solution which enables a means of using the UCC for tenants of cloud services to leverage the advantages of the UCC for their individual needs. In order to implement the UCCaaS to interoperate with the UCC and their IDs, the system needs some kind of entry point into the cloud environment in order to be able to access the IDs, define policies, and implement policies. The UCCaaS provides this entry point and functionality to enhance the benefits of the UCC. The disclosure uses UCC to support both north- and south-bound APIs for tenants, providers and applications leveraging the defined IDs.

This disclosure includes systems, methods and computer-readable storage devices which implement the concept disclosed herein. In one example, the method includes assigning, by a software-defined-network (SDN) controller in an SDN-enable cloud environment, a service-ID to a service and a tenant-ID to a tenant to yield universal cloud classification details, and extracting, from a data flow, the universal cloud classification details. The method includes receiving a policy, generating flow rules based on the policy and universal cloud classification details, and transmitting the flow rules to an openflow application to confine packet forwarding decisions for the data flow.

The UCCaaS can provide APIs to enable calls to request the assignment of a service-ID and a tenant-ID from a service like Keystone. OpenStack Identity (known as Keystone) provides a central directory of users mapped to the OpenStack services they can access. It acts as a common authentication system across the cloud operating system and can integrate with existing backend directory services like the lightweight directory access protocol (LDAP). It supports multiple forms of authentication including standard username and password credentials, token-based systems and AWS-style (i.e., AMAZON WEB SERVICES) logins. Additionally, the catalog provides a queryable list of all of the services deployed in a cloud (e.g., OPENSTACK) in a single registry. Users and third-party tools can programmatically determine which resources they can access. In the present disclosure, Keystone (or a similar service) can communicate through APIs to a central registrar or entity to perform one or more of assigning, defining, generating, managing, maintaining, updating, deleting, etc. the IDs.

The UCCaaS can then extract the IDs, access a database that stores the IDs and associated policies (on a per-service, per-tenant or even per-workload basis). The UCCaaS can then use the policies to define flow rules that are then delivered via an API to an OpenFlow Application and hardware/software switches for managing data flow.

DESCRIPTION

When a person wants to define a network, she must rely on various protocols which have been defined for environments where the cloud was not envisioned at the time. There are limitations in terms of scalability, but none of them have in the context of the cloud. Conventional classification is typically based on Internet Protocol (IP) prefixes or addresses, protocol numbers identifying, for example, TCP or UDP, TCP/UDP port numbers and higher layer identities. These isolation techniques are used to identify individual endpoints and applications hosted. However, in cloud computing, providers host many different services on top of the same UDP/TCP ports, the same range of public IP addresses across many endpoints. There is currently no service-awareness in networks, which is critical to properly isolate providers, theirs services and tenants.

These challenges magnify in the case of running services across multiple clouds (InterCloud use-case). Classification becomes even more critical with multi-tenancy and tenant/service mobility across clouds. Traffic between cloud environments needs to be affiliated to its originating cloud provider and services.

With the introduction of cloud computing, ways to adapt network IDs to the virtualized, dynamic and agile infrastructure of a cloud environment have been tried. In legacy networks, matching traffic against their VLAN, IP or port affiliation often has been granular enough to accurately define business related policies. However, with cloud computing, simply relying on VLANs, IP addresses or port numbers as classification mechanisms, is not sufficient. Classifying traffic based on network IDs requires deep-packet-inspection. This typically results in high latency for the tenant.

Virtual Extensible Local Area Networks (VxLANs) have been introduced recently to circumvent the limitations providers faced using VLANs. VxLAN now offers a 24-bit network segmentation ID. Even though it might address the scale limitations of VLANs, it still lacks the cloud computing specific classification and separation of providers, services and tenants.

A hierarchical end-to-end classification scheme is used in cloud computing. The classification scheme includes a cloud-identifier (ID), a service-ID, a tenant-ID, and/or a workload-ID to identify a cloud provider, a service provided by the cloud provider, a tenant that uses the service, and/or a workload or subpart of a workload from the tenant. The cloud-ID is usually assigned once when a user registers a cloud environment. In a cloud computing environment, conventional techniques do not allow classification and isolation on a per-cloud/-service and -tenant basis on the network layer. Multi-tenancy is an important aspect of cloud computing; however, the conventional techniques to define multi-tenancy in the networks are not sufficient for cloud environments.

The present disclosure provides a new approach to enable and disable the UCC on-demand as well as enable it on a per-tenant, per-service or even on a per-workload or sub-workload basis. The disclosure first shall discuss basic computer hardware components and then shall address more specifically the UCCaaS model.

FIG. 1 discloses some basic hardware components that can apply to system examples of the present disclosure. Following the discussion of the basic example hardware components, the disclosure will turn to the UCCaaS approach. With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 125 to the processor 110. The system 100 can include a cache 112 of high-speed memory connected directly with, in close proximity to, or integrated as part of the processor 110. The system 100 copies data from the memory 115, 120, and/or 125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability. The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output system (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 130 is connected to the system bus 105 by a drive interface. The drives and the associated computer-readable storage devices provide non-volatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, an output device such as a display 135, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs a storage device such as a hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

Figure 2:
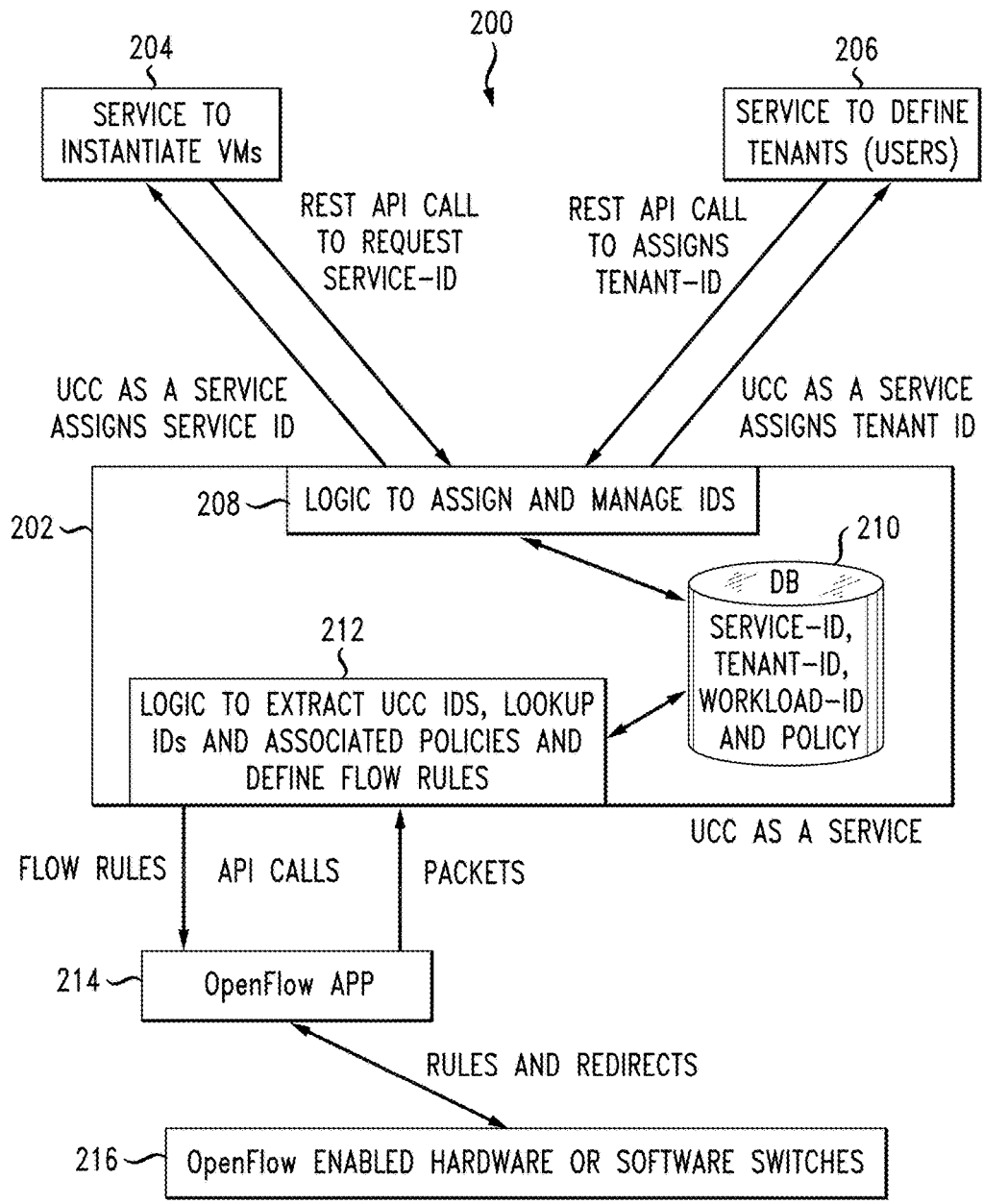
FIG. 2 illustrates the general context in which the present disclosure applies.

The disclosure now turns to FIG. 2, which illustrates an example environment 200 for UCC as a service. The present inventors disclose a novel approach to dynamically and on-demand leverage the UCC cloud-IDs. This leverage is enabled through a service model for the UCC. This service model will be integrated into a cloud environment enabling tenants to dynamically leverage UCC in their environments.

The following provides an example of a structure for a cloud-ID (C-ID), service-IDs (S-IDs), and tenant-IDs (T-IDs): Cloud provider 1 is assigned cloud-ID 12:12:12:12; Cloud services 1 and 2 are assigned S-IDs ab:ab:ab:ab:ab:ab and 34:34:34:34:34:34, respectively; Tenant 1 is assigned T-IDs cd:cd:cd:cd:cd:cd and 56:56:56:56:56:56 for cloud service 1 and 2, respectively; and Tenant 2 is assigned T-IDs 78:78:78:78:78:78 and 78:78:78:78:78:78 (i.e., the same T-ID) for cloud services 1 and 2, respectively.

These or other structures of the various ID's can be utilized in the present disclosure. A similar ID structure can also be applied to workload or a subcomponent of the workload.

As shown in FIG. 2, the UCC as a Service (UCCaaS) 202 application is aware of the IDs defined within a cloud environment for the services 204 and the tenants 206. Based on the UCC classification details it gathers from the flows 212, it pushes flow rules to the OpenFlow forwarder 214 to configure forwarding decisions 216.

The concept of "UCC as a Service" is introduced as a module 202 in a software-defined network (SDN)-enabled cloud environments (e.g., OpenDaylight, VTS, etc.) 200 to leverage the UCC IDs. Instead of relying on every device within the environment to inspect and understand the UCC information, the UCCaaS 202 moves this logic out to an SDN controller. As an additional application (App) offering south- and north-bound APIs, the UCCaaS 202 taps into already existing infrastructure applications used to define forwarding rules. In addition, the UCCaaS 202 leverages the UCC IDs incorporated into the IPv6 extension headers (or other headers or data fields in a packet), defines forwarding decisions on internal rules (which can be obtained from a database 210) and pushes these out to the OpenFlow Application 214 using the standardized 5-tuple flow rules. Other structures can be used as well to pass the flow rules through the API. The logic around the UCC can be enabled or disabled by simply adding another application to an SDN controller. The flow rules, defined by using the 5-tuple classification or in another manner, can be defined without direct understanding of UCC ID's on the hardware and/or software switches.

The application 202 of FIG. 2 offers a north-bound and a south-bound API interface shown as "API Calls" between the UCCaaS 202 and the OpenFlow Application 214, as API Calls between the UCCaaS 202 and the various services to instantiate virtual machines 204 and to the service to define tenants 206. The north-bound interface is used both the handle service-ID assignment 204 and tenant-ID assignment 206 and lifecycle management. A cloud orchestration tool can directly interact with the UCCaaS application 202 to request tenant-IDs and service-IDs when spinning up or creating applications or tenants respectively. The south-bound API on the other hand allows other applications, the provider or the tenant to interact with UCCaaS 202 to query IDs and their associated tenant, service information.

The UCCaaS can provide APIs to enable calls to request the assignment of a service-ID and a tenant-ID from a service (204, 206) like OpenStack Identity. OpenStack Identity (known as Keystone) provides a central directory of users mapped to the OpenStack services they can access. It acts as a common authentication system across the cloud operating system and can integrate with existing backend directory services like LDAP. It supports multiple forms of authentication including standard username and password credentials, token-based systems and AWS-style (i.e. Amazon Web Services) logins. Additionally, the catalog provides a queryable list of all of the services deployed in an OpenStack cloud in a single registry. Users and third-party tools can programmatically determine which resources they can access. In the present disclosure, an identity service for cloud computing solutions, such as Keystone for OpenStack, can communicate through APIs to a central registrar or entity to perform one or more of assigning, defining, generating, managing, maintaining, updating, deleting, etc., the IDs.

The UCCaaS 202 stores the various IDs in a database 210 can then can extract the IDs from packet in data flows, access a database 210 that stores the IDs and associated policies (on a per-service, per-tenant or even per-workload, per-subcomponent of workload basis). The UCCaaS 202 can then use the policies to define flow rules that are then delivered via an API to an OpenFlow Application 214 and Hardware/Software switches for managing data flow 216.

FIG. 2 illustrates a logical component 212 in the UCCaaS 202 that inspects the packets received from a OpenFlow enabled vSwitch 216 through an OpenFlow Application 214, detects the service-ID, tenant-ID, workload-ID, sub-workload-ID and/or other IDs and requests details such as flow-definitions and policy miles 210 that can be enforced on the switch 216. This is just an example use-case for the south-bound API interface and could be used by other applications as well. In addition to the API interfaces, the UCCaaS 202 also maintains a database 210 that stores the tenant/service/workload-IDs and any associated details such as application information, assigned policies, etc. The central database 210 stores the service/tenant/workload-IDs and correlation between the IDs as well as the policies we want to use for an ID, a pair of IDs, or three IDs. It stores the IDs, the relationship between the IDs and the policies and how they are applied. Service-IDs can be a network policy, database policy, bandwidth policy, processor policy (i.e., number of processors (real or virtual)) that are allowed to be used at one time, or characteristics of processors (i.e., does the tenant want real or virtual processor, or a particular clock speed) to be used for a particular tenant or workload. Workload-IDs can span an entire "job" or workload or can represent a subcomponent of workload, such as the data staging component which can have different policies applies than the processing component.

A tenant may want to have a first set of flow ales apply to a first workload or application and a second set of flow rules apply to a second workload or second application. The different treatment can be implemented either by a separate application ID that is assigned by a service or by the tenant or by an alternate tenant-ID such that the tenant-ID can identify the tenant and workload for that tenant. In one aspect, the fields used the assign the service-ID can have options to be able to specify or identify particular workload. Thus, the workload-ID can in one aspect but a subset of the service-ID. The service-ID is unique but a subfield in the service-ID can identify the workload-ID. In this regard, the workload-ID provide a further refining of the policies where a first job (such as a query to a database) may be identified through a workload-ID as a lower priority job and a second job from the tenant can be assigned a higher priority, with more network resources enabled, through its identification via the workload-ID. In this regards, the ID could also be used to chop up a workload into sub components and a respective subdivided component could have a different policy applied. For example, a data staging component of workload may have a separate ID to an ID associated with a processing stage of the workload.

The UCCaaS application 202 (in the application layer) performs two operations. First, it is used to manage the provider-specific service, tenant and/or workload-IDs 208 and maintains the data store 210 of the assigned IDs. The IDs are handed out by the services that are used to instantiate virtual machines and define tenants and/or workload for cloud services. Part or all of the information is then used to define policies for flows within the cloud provider's network. For example, the workload-ID and the service-ID can be utilized to define a particular policy which guides the ultimate flow rules. Any combination of a workload-ID, a service-ID and a tenant-ID can be used to develop or apply a policy. In one aspect, a workload can have a changing ID throughout its processing. For example, a workload may start out performing a data intensive portion of its work under a first ID, and then when the workload transitions to a more compute processor component of its job, then the workload can transition to another workload ID.

In one aspect, the APIs are accessible to outside of a cloud providers environment to exchange ID specific information (service-ID related) in a secure way. Included herein is the concept of providing means for external parties to access certain information of the cloud-IDs saved within the UCCaaS 202 enables exchange of cloud-ID information across multiple cloud platforms.

In another aspect, the UCCaaS 202 can operate both legacy non-UCC enabled and newer UCC-enabled environments by making the cloud-IDs available as an overlay. Even if network elements don't support UCC-enabled operations directly in the transport, the network elements can leverage the cloud-IDs via API calls.

In yet another aspect, the UCCaaS 202 can be used to define forwarding decisions either on Layer 2 or Layer 3 devices. The UCCaaS 202 can offer south-bound API interfaces that enable interaction with network elements and allows pushing policies based on their requests. The UCCaaS 202 can maintain forwarding definitions on a per-service, per-tenant and/or per-workload basis that can be used to define L2 or L3 policies. For example, a virtual switch can forward a packet to its SDN controller (such as OpenDayLight, VTS, etc.). The controller inspects the packet to define forwarding rules. By inspecting the packet, the controller detects the UCC header and extracts the service-ID, tenant-IDs, and/or workload-IDs. Via an API call, the controller can communicate with the UCCaaS 202 to request any policies defined to the Service/Tenant/Workload-ID set. The UCCaaS 202 receives the API call and responds with previously defined policies. The policies can be define by the provider, the service, the tenant itself, or be defined as part of the workload on a predetermined basis or dynamically based on feedback from the environment. The policy can be set in part by any of the parties as well. Based on the provided policies, the OpenFlow based controller 214 in the network layer (i.e., Layer 3 of the OSI) pushes forwarding rules down through an API to the hardware switch or virtual switch 216.

The UCCaaS APIs can be used by other services such as a segment routing as a service to request policies to define the segment routing forwarding overlay (See CPOL 1003152, incorporated herein by reference). Similar to the layer 2 example previously described, the provider, the application and/or the tenant can define policies that influences automatically or based on thresholds the forwarding behavior and segment routing overlay on a per service/tenant/workload-ID set.

The UCCaaS 202 can introduce a plurality of enhancements to cloud environments wanting to use the UCC-based identifiers. While UCC itself is proposed to operate on the Network Layer of the OSI model, the UCCaaS 202 can leverage the transmitted information in a centralized way eliminating the need for every network device to requiring an understanding of the UCC. With the support of APIs to both the network devices and tenants, the provider and applications (and ideally as well to external parties), the UCC provides a way to overlay UCC information and define policies based on the IDs provided (on a per service/tenant/workload-ID basis).

Several of the benefits of the UCCaaS 202 include the ability to leverage the UCC on demand and on dynamic basis in a way that is defined by tenant, provider, workload and/or external party needs. It is an easier implementation and deployment of UCC and can include support for the UCC on legacy deployments. There are other services in a cloud providers environment can leverage UCC and its IDs to enforce policies on a per-tenant, per-service, and/or per-application basis.

Figure 3:
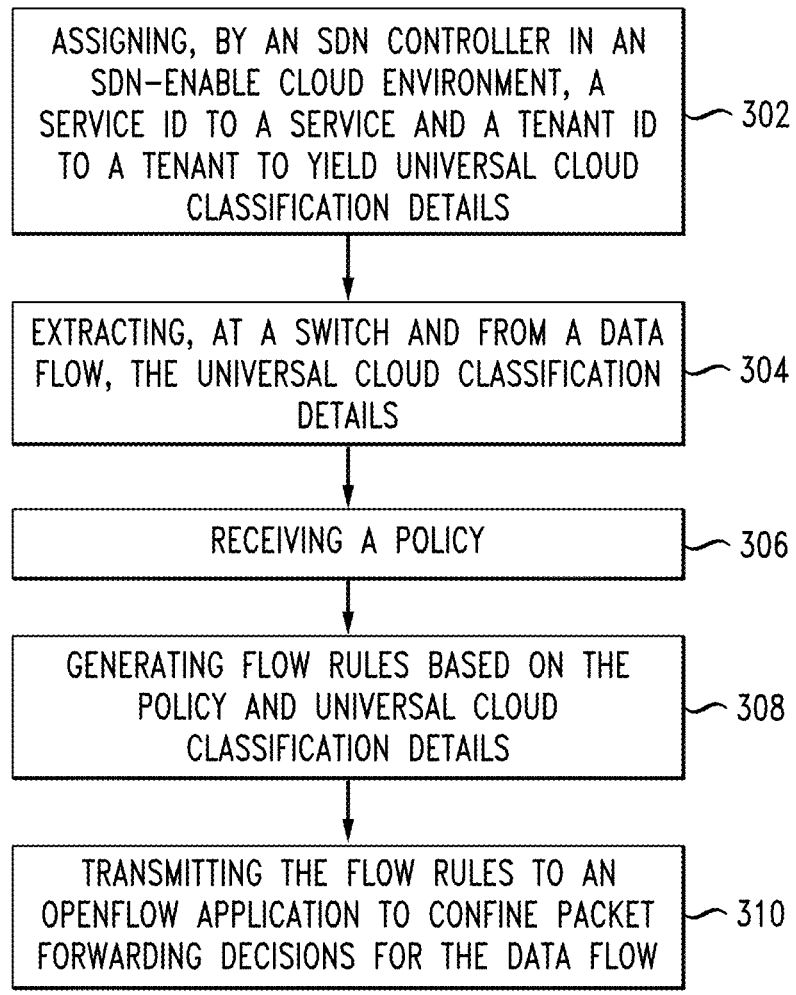
FIG. 3 illustrates an example method.

FIG. 3 illustrates method example according to this disclosure. The method includes assigning, by a software defined network controller in a software-defined network—enable cloud environment, a service-ID to a service and/or a tenant-ID to a tenant to yield universal cloud classification details (302). As noted above, a workload-ID can also be assigned to workload or parts of workload. The method includes extracting, from a data flow, the universal cloud classification details (304) and receiving a policy (306). The policy can include one or more forwarding and routing rules, workload or tenant rules, etc.

The method includes generating flow rules based on the policy and universal cloud classification details (308) and transmitting the flow rules to an openflow application to confine packet forwarding decisions for the data flow (310). The openflow application can forward the flow rule and/or provide direction to hardware or software switches for managing the routing of packets on a per service/tenant/workload basis.

In one aspect, there can be backwards compatibility with the conventional way of managing the routing of data flows. In this regard, developing the flow rules based on policies and service/tenant/workload-IDs will be applied to manage at least a part of the overall routing of data but the standard use of IP addresses can be applied also to part of the overall routing of a data flow. The UCC IDs, for example, can be used to do the forwarding of data without completely replacing the IP addresses. In another aspect, the use of UCC IDs as disclosed herein can be used to completely replace all other routing instructions. The UCC IDs provide a much more granular approach to flow control.

In one aspect, the IDs are used in the decision making process of how to define the flow rules that apply to IP addresses or MAC addresses. For example, the component 212 in the UCCaaS determines that a particular packet has a service-ID and a particular tenant-ID, and based on the IDs, identifies a policy which directs how the network should route or switch the flow containing the pack along a certain path.

One or more of the service-ID, the tenant-ID and the workload-ID are stored in a database and used for the various purchases set forth herein. The method can include storing in a header or other field of a packet in a packet flow one or more of the service-ID, the tenant-ID and the workload-ID. The flow rules can be generated or defined without direct understanding of the service-ID, the tenant-ID or the workload-ID. The policy can be predetermined and selected based on one or more of the service-ID, the tenant-ID, and the workload-ID. Or, they policy can be dynamic and generated as needed based on one or more of the service-ID, the tenant-ID, and the workload-ID. External data can be utilized as well for choosing or generating the policy. Thus, the policy can be defined on one of a per service-ID basis, per tenant-ID basis, per workload-ID basis, or some other basis such as external data. The extracting of the universal cloud classification details can be performed at an openflow application or a UCCaaS component. A controller module in the software-defined network-enable cloud environment, or some other component, can assign the service-ID to the service, the tenant-ID to the tenant and/or the workload-ID to the workload of the tenant. When the workload-ID is assigned, the universal cloud classification details can include the service-ID, the tenant-ID and the workload-ID, as well as any other external data. The method can further include generating the flow rules based on the universal cloud classification details.

The present examples are to be considered as illustrative and not restrictive, and the examples is not to be limited to the details given herein, but may be modified within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   assigning, by a software defined network controller in a software-defined network-enable cloud environment, a service-ID to a service and a tenant-ID to a tenant, to yield universal cloud classification details;
   extracting, from a data flow, the universal cloud classification details;
   generating flow rules based on a received policy and universal cloud classification details, the flow rules defined without inspecting each device to obtain a direct understanding of the tenant-ID; and
   transmitting the flow rules to an application to confine packet forwarding decisions for the data flow.

2. The method of claim 1, further comprising:
   storing the service-ID and the tenant-ID.

3. The method of claim 1, wherein the universal cloud classification details are stored in a header of a packet in the data flow.

4. The method of claim 1, wherein the flow rules are defined using a 5-tuple classification.

5. The method of claim 1, wherein the flow rules are defined without direct understanding of the service-ID.

6. The method of claim 1, wherein the software defined network controller communicates via an application programming interface.

7. The method of claim 1, wherein the policy is based on the service-ID and the tenant-ID.

8. The method of claim 1, wherein the policy is defined on one of a per service-ID basis and per tenant-ID basis.

9. The method of claim 1, wherein the extracting comprises extracting the universal cloud classification details at one of an openflow application and a universal cloud classification as a service component.

10. The method of claim 1, wherein a controller module in the software-defined network-enable cloud environment assigns the service-ID to the service and the tenant-ID to the tenant.

11. The method of claim 1, further comprising:
assigning a workload-ID to workload of the tenant,
wherein the universal cloud classification details comprise the service-ID, the tenant-ID and the workload-ID.

12. The method of claim 11, further comprising:
generating the flow rules based on the universal cloud classification details.

13. A system comprising: one or more processors; and
a computer-readable medium, storing instructions which, when executed by the one or more processors, cause the one or more processors to perform operations comprising:
assigning, by a software-defined network controller in a software-defined network-enable cloud environment, a service-ID to a service and a tenant-ID to a tenant to yield universal cloud classification details;
extracting, at a switch and from a data flow, the universal cloud classification details;
receiving a policy;
generating flow rules based on the policy and universal cloud classification details, the flow rules defined without inspecting each device to obtain a direct understanding of the tenant-ID; and
transmitting the flow rules to an application to confine packet forwarding decisions for the data flow.

14. The system of claim 13, wherein the flow rules are defined using a 5-tuple classification.

15. The system of claim 13, wherein the universal cloud classification details are stored in a header of a packet in the data flow.

16. The system of claim 13, wherein the software-defined network controller communicates via an application programming interface.

17. The system of claim 13, wherein the policy is based on the service-ID and the tenant-ID.

18. The system of claim 13, wherein the policy is defined on one of a per service-ID basis and per tenant-ID basis.

19. The system of claim 13, wherein the computer-readable medium stores additional instructions which, when executed by the processor, cause the processor to perform further operations comprising assigning a workload-ID to workload of the tenant, wherein the universal cloud classification details comprise the service-ID, the tenant-ID and the workload-ID.

20. A computer-readable storage device storing instructions via a non-transitory storage medium which, when executed by a processor, cause the processor to perform operations comprising:
assigning, by a software-defined network controller in a software-defined network-enable cloud environment, a service-ID to a service and a tenant-ID to a tenant to yield universal cloud classification details;
extracting, at a switch and from a data flow, the universal cloud classification details;
receiving a policy;
generating flow rules based on the policy and universal cloud classification details, the flow rules defined without inspecting each device to obtain a direct understanding of the tenant-ID; and
transmitting the flow rules to an application to confine packet forwarding decisions for the data flow.

* * * * *